United States Patent
Sureaud

(10) Patent No.: US 7,431,211 B2
(45) Date of Patent: Oct. 7, 2008

(54) TIME-MEASUREMENT SECURED TRANSACTIONAL ELECTRONIC ENTITY

(75) Inventor: Jean Sureaud, Saint Laurent du Var (FR)

(73) Assignee: Oberthur Technologies, Paris (FR)

( * ) Notice: Subject to any disclaimer, the term of this patent is extended or adjusted under 35 U.S.C. 154(b) by 369 days.

(21) Appl. No.: 10/508,865

(22) PCT Filed: Mar. 24, 2003

(86) PCT No.: PCT/FR03/00923

§ 371 (c)(1), (2), (4) Date: Feb. 8, 2005

(87) PCT Pub. No.: WO03/083769

PCT Pub. Date: Oct. 9, 2003

(65) Prior Publication Data

US 2005/0135411 A1 Jun. 23, 2005

(30) Foreign Application Priority Data

Mar. 28, 2002 (FR) .................. 02 03916
May 28, 2002 (FR) .................. 02 06514

(51) Int. Cl.
*G06K 7/14* (2006.01)

(52) U.S. Cl. ............ 235/454; 368/204; 370/463

(58) Field of Classification Search ........ 235/454; 368/204

See application file for complete search history.

(56) References Cited

U.S. PATENT DOCUMENTS

| | | | | |
|---|---|---|---|---|
| 5,049,958 A | * | 9/1991 | Baglee | 257/306 |
| 5,925,942 A | * | 7/1999 | Theobald | 307/125 |
| 6,784,933 B1 | * | 8/2004 | Nakai | 348/302 |
| 2004/0099746 A1 | * | 5/2004 | Norton | 235/492 |
| 2004/0207363 A1 | * | 10/2004 | Kalogeropoulos | 320/128 |
| 2005/0185515 A1 | * | 8/2005 | Berstis et al. | 368/204 |

FOREIGN PATENT DOCUMENTS

| | | |
|---|---|---|
| DE | 44 14 159 | 7/1995 |
| FR | 2 693 014 | 12/1993 |
| FR | 2 776 410 | 9/1999 |

* cited by examiner

*Primary Examiner*—Michael G. Lee
*Assistant Examiner*—Allyson N Trail
(74) *Attorney, Agent, or Firm*—Young & Thompson

(57) ABSTRACT

An electronic entity such as a chip card containing time measurement elements includes a capacitative component (20) having a leak through the dielectric area thereof and being able to be charged when the entity is coupled to an electric power source and a member (22) for measuring the residual charge of the capacitative component which is implemented in a subsequent measure.

19 Claims, 1 Drawing Sheet

TIME-MEASUREMENT SECURED TRANSACTIONAL ELECTRONIC ENTITY

The invention relates to a transactional electronic entity and is directed in particular to an improvement made to a transactional electronic entity so that it is able to produce an indication at least partly representative of an elapsed time between two events, the improvement being noteworthy by virtue of its level of integration and its autonomous operation, i.e. its operation independent of any external time measuring system (clock signal generator or the like), which entity is consequently relatively inviolable. For example, the invention may be applied to any autonomous transactional electronic entity, such as a microcircuit card, for example, comprising means for coupling it at least temporarily to an electrical power supply to carry out a transaction. The invention in particular determines the elapsed time between two successive transactions, a knowledge of this additional data item enabling attempted fraud to be detected and consequently making transactions more secure. The term "transaction" refers in a very general sense to any exchange of data between the electronic entity in question and any server hosting software capable of controlling said transaction, for example a computer, an automatic device equipped with a microcircuit card reader, or any other equipment capable of exchanging information with a microcircuit card of this type or an equivalent transactional electronic entity. It should be noted that the invention is of benefit in this context because the means for determining the elapsed time between two transactions may be situated in the autonomous transactional electronic entity and necessitate no electrical power supply integrated into said entity.

A secure transaction aims to take into account certain parameters, such as, for example the identity of the holder of the autonomous transactional electronic entity (the microcircuit card), a code known to the cardholder, or a time interval between two events that is considered to be either normal or abnormal. For example, transactions that do not contain an indication of the time at which they are effected are considered to be much less secure, or even unacceptable in certain situations. The invention provides a solution to this type of problem.

To be more specific, the invention provides a transactional electronic entity characterized in that it comprises at least one subsystem comprising a capacitive component having a leak across its dielectric space, means for coupling said capacitive component to an electrical power supply to be charged by said electrical power supply, and means for measuring the residual charge in said capacitive component, said residual charge being at least in part representative of a time elapsed after said capacitive component is decoupled from said electrical power supply.

In the case of an autonomous electronic entity, such as a microcircuit card, for example, the electronic entity as a whole comprises means for connecting it to an electrical power supply and in this case said capacitive component of the subsystem can be charged only if the electronic entity is connected to the electrical power supply. The latter is external to the entity. For example, the electronic entity could be provided with switching means for disconnecting said capacitive component from the electrical power supply, this disconnection event initializing the time measurement. More generally, the time measurement, i.e. the variation of the charge in the capacitive component, starts as soon as the component, after being charged, is electrically isolated from any other circuit and is able to discharge only across its own dielectric space.

However, even if the measured residual charge is physically linked to the elapsed time between isolating the capacitive component and a given measurement of its residual charge, a measured time between two measurements may be determined, the first measurement determining, so to speak, a reference residual charge (the measured time is considered to be either normal or abnormal, or could in any event be taken into account to determine if the current use of the electronic entity is normal or abnormal). The measuring means are used when it is required to know an elapsed time.

For example, the security of a transaction may be improved if it is possible to take into account the time that has elapsed between two transactions involving the same autonomous electronic entity, for example a microcircuit card such as a bank card, an access control card, etc.

Accordingly, if the time at which a transaction is effected can be stored by a server or a central system and the autonomous entity can evaluate the time that elapses between two transactions, comparing these two times makes the transaction more secure, i.e. detects attempted fraud taking these parameters into account.

Now, most microcircuit cards cannot verify any time-related information that might be supplied to them during a transaction, for the simple reason that they have no internal clock able to operate when they are powered down. One solution to this problem is for the plastic material microcircuit card to be equipped with a film battery accommodated within the thickness of the card. However, this solution is costly, fragile (given its construction), and also vulnerable, since a fraudster may easily obtain access to the power supply and consequently to the current values used in the classic differential power analysis (DPA) method of breaking a cryptographic process.

The invention enables an entity of the above kind to provide information on the time between two transactions and to validate that information. The basic idea of the invention is to measure the time between two transactions using means that do not necessitate an internal electrical power supply.

To be more precise, the invention relates to an autonomous transactional electronic device comprising means for connecting it to an external electrical power supply to effect a transaction, characterized in that it comprises at least one subsystem comprising a capacitive component having a leak across its dielectric space, connected to said external electrical power supply to be charged thereby during a transaction, and means for measuring the residual charge of said capacitive component, said residual charge being at least partly representative of the elapsed time since the last transaction.

In a preferred embodiment, the measuring means comprise a field-effect transistor whose gate is connected to one terminal of said capacitive component, i.e. to one "plate" of a capacitor. This kind of capacitor may be fabricated in MOS technology, its dielectric space consisting of silicon oxide. In this case, it is advantageous if the field-effect transistor is also fabricated in MOS technology. The gate of the field-effect transistor and the "plate" of the MOS capacitive component are connected and constitute a kind of floating grid that may be connected to a component for injecting charge carriers. There may also be no electrical connection as such with the external environment. The connection of the floating grid may be replaced by an (electrically isolated) control grid that loads the floating grid, for example by the tunnel effect or by means of "hot carriers". This grid causes charge carriers to move toward the floating grid common to the field-effect transistor and the capacitive component. This technique is well known to manufacturers of EPROM and EEPROM. The common floating grid remains isolated during the time period between two connections or couplings to an external power supply, i.e. between two successive transactions. The transistor and the capacitive component may then constitute a unit integrated into the microcircuit or forming part of another microcircuit housed in the same autonomous entity.

During a transaction, when the autonomous electronic entity is still coupled to an external electrical power supply, the capacitive component is charged to a predetermined value, either a known value or a value that is measured and stored, and the measuring means are connected to one terminal of the capacitive component. At the end of the transaction, the measuring means, in particular the field-effect transistor, are no longer supplied with power but the grid connected to the terminal of the capacitive component is at a voltage corresponding to the charge in the latter component. Throughout the time period between two transactions, the capacitive component is slowly discharged across its own dielectric space and the voltage applied to the gate of the field-effect transistor therefore progressively decreases. When the electronic entity is again connected to an electrical power supply to effect a new transaction, an electrical voltage is applied between the drain and the source of the field-effect transistor. Thus a current flowing from the drain to the source or vice versa is generated and may be collected and analyzed. The value of the electrical current measured depends on the technological parameters of the field-effect transistor, the potential difference between the drain and the source, and the voltage between the gate and the substrate. The current therefore depends on charge carriers accumulated in the floating grid common to the field-effect transistor and to the capacitive component. Consequently, this drain current is also representative of the time that has elapsed between the two transactions.

The leakage current of the above type of capacitor depends of course on the thickness of its dielectric space and on other technological parameters such as the lengths and areas of contact of the elements of the capacitive component. It is also necessary to take into account the three-dimensional architecture of the contacts of these components, which may induce phenomena having the particular feature of modifying the leakage current parameters (for example modifying the tunnel capacitance value). The type and quantity of dopants and defects may be modulated to modify the characteristics of the leakage current. Temperature variations, to be more precise the mean energy input to the card between two transactions, i.e. during the time period that is to be determined, also have an influence. In fact, any parameter intrinsic to the MOS technology may be used to modulate the time measurement process. Where the heat input is concerned, however, if the dielectric is very thin (less than 5 nanometers thick), the corresponding subsystem is practically insensitive to temperature but the leak is relatively high, and such that only relatively short time periods may be measured, of the order of a few minutes or less. This kind of subsystem with a high leakage independent of temperature may nevertheless be used to detect certain types of fraud. For example, this type of capacitive component detects very closely spaced successive resets that are characteristic of certain of the DPA attacks referred to above.

To measure longer time periods, it is necessary to use a capacitive component having a thicker dielectric space. In this case, the leak is sensitive to temperature variations. To obtain information that is substantially representative of time only, at least two subsystems as defined hereinabove are provided, operating "in parallel". The two temperature-sensitive capacitive components are defined with different leaks, other things being equal, i.e. their dielectric spaces (their silicon oxide layers) are different thicknesses.

To this end, according to one advantageous feature of the invention, the electronic entity defined above is characterized in that it comprises at least two of said subsystems comprising capacitive components having different leaks across their respective dielectric spaces and in that it further comprises means for processing measurements of respective residual charges to extract from said measurements information substantially independent of heat input to said entity during the time elapsed between two transactions.

For example, the processing means may comprise a table of stored time values that is addressed by said respective measurements. In other words, each pair of measurements designates a stored time value independent of temperature and temperature variations during the measured period. The electronic entity normally comprises a memory associated with the microprocessor and a portion of that memory may be used to store said table.

Alternatively, the processing means may comprise calculation software programmed to execute a predetermined function for calculating the time information substantially independently of the heat input and as a function of the two measurements cited above.

The invention will be better understood and other advantages of the invention will become more clearly apparent in the light of the following description, which is given by way of example only and with reference to the appended drawing, in which.

Figure 1:
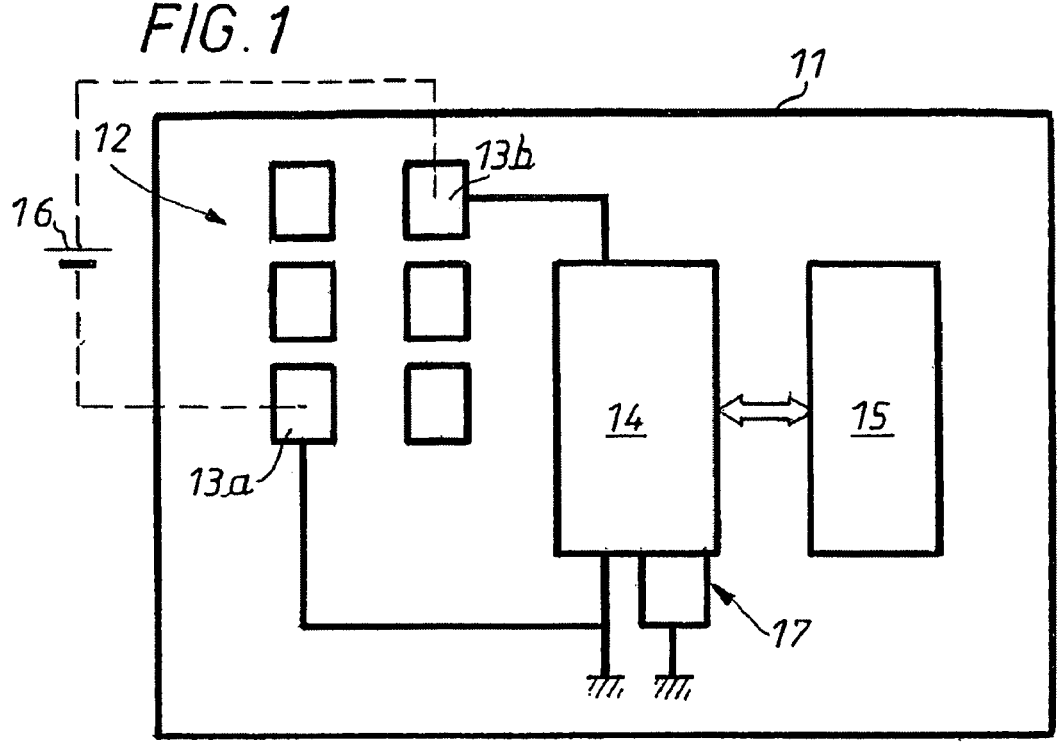
FIG. 1 is a block diagram of a microcircuit card equipped with the improvement according to the invention.

An autonomous transactional electronic entity 11, in this example a microcircuit card, comprises means 12 for coupling it to an external electrical power supply 16. In this example, the entity comprises metal connection areas adapted to be connected to a card reader unit. Two connecting areas 13*a*, 13*b* are reserved for supplying power to the microcircuit from an electrical power supply accommodated in the server or a similar device to which the autonomous electronic entity is momentarily connected. These connection areas could be replaced by an antenna housed within the thickness of the card and adapted to supply the microcircuit with the electrical energy necessary for its power supply whilst assuring the bidirectional transmission of radio frequency signals for exchanging information. The microcircuit comprises a microprocessor 14 associated in the conventional way with a memory 15.

Figure 2:
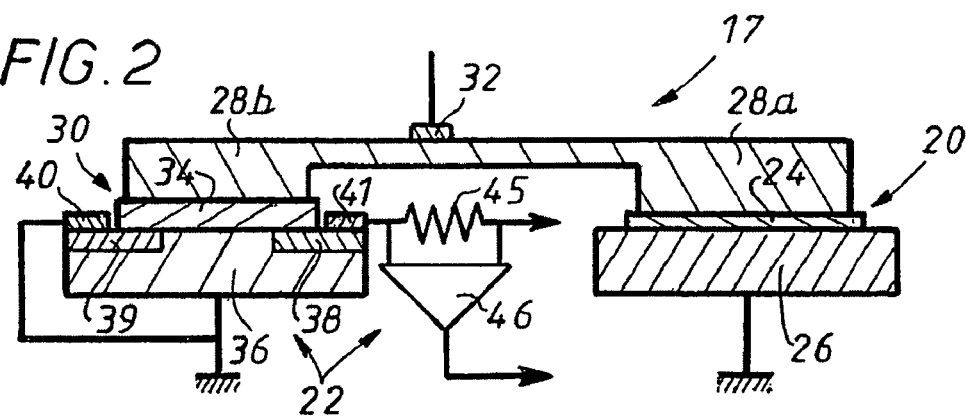
FIG. 2 is a theoretical diagram of one of said subsystems.

In the case of the invention, the electronic entity comprises or is associated with at least one subsystem 17 for measuring time. The subsystem 17, which is represented in more detail in FIG. 2, is therefore housed in the electronic entity. It may form part of the microcircuit and be produced using the same integration technology as the microcircuit. In the present example, this subsystem is not connected to any internal electrical power supply. It can therefore be supplied with power only when the electronic entity is actually coupled to a server or a card reader incorporating an electrical power supply. However, if the electronic entity must be supplied with power at all times, the subsystem 17 for measuring time may be supplied with power or not via switching means for coupling it to or isolating it from the electrical power supply, these means being an integral part of the microprocessor 14, for example, or consisting of switches controlled by it.

The subsystem 17 comprises a capacitive component 20 having a leak across its dielectric space 24 and means 22 for measuring the residual charge in the capacitive component, said residual charge being at least partly representative of the time elapsed since the capacitive component was decoupled from the electrical power supply, in the present example between two transactions, i.e. between two operations in which the microcircuit is effectively coupled to a server, i.e. connected to an external electrical power supply. The capacitive component is charged by the external electrical power supply during a transaction, either by direct connection, as in the example described here, or by any other means for charging the gate. The tunnel effect is one method of charging the gate with no direct connection. In the present example, the microprocessor 14 controls charging of the capacitive component.

In the example, the capacitive component is an MOS technology capacitor. The dielectric space 24 of this capacitor is a layer of silicon oxide deposited onto the surface of a substrate 26 constituting one of the plates of the capacitor. In the present example this substrate is grounded, i.e. connected to one of the power supply terminals of the external electrical power supply when the latter is connected to the card. The other plate of the capacitor is a conductive deposit 28a applied to the other side of the silicon oxide layer.

Said measuring means essentially comprise a field-effect transistor 30, in the present example fabricated in the MOS technology, like the capacitor, and whose gate is connected to one terminal of the capacitive component. In the example, the gate is a conductive deposit 28b of the same kind as the conductive deposit 28a that constitutes the plate of the capacitive component. These two deposits are either connected to each other or merged into one deposit. A connection 32 to the microprocessor 14 applies a voltage to these two deposits for a short time interval necessary for charging the capacitive component. The microprocessor controls the application of this voltage. More generally, the connection 32 charges the capacitive component 20 at a given time, under the control of the microprocessor, and it is from the time at which the microprocessor cuts off this charging connection (or when the electronic entity as a whole is decoupled from any electrical power supply) that the discharging of the capacitive component across its dielectric space begins, this loss of electrical charge being representative of the elapsed time. The time measurement entails momentary conduction of the transistor 30, which presupposes the presence of an electrical power supply connected between its drain and its source. The MOS field-effect transistor comprises, in addition to the gate, a gate dielectric space 34 separating the latter from a substrate 36 in which a drain region 38 and a source region 39 are defined. The gate dielectric space 34 consists of an insulative layer of silicon oxide. The source connection 40 to the source region is grounded and connected to the substrate and the drain connection 41 is connected to a drain current measuring circuit that includes a resistor 45 to the terminals of which the two inputs of a differential amplifier 46 are connected. The output voltage of this amplifier is therefore proportional to the drain current.

The grid 28b is floating during the time that elapses between two couplings or connections to an external power supply, i.e. between two successive transactions. In other words, no voltage is applied to the gate during this time. On the other hand, since the gate is connected to a plate of the capacitive component 20, the gate voltage during this time is equal to the voltage that develops between the terminals of said capacitive component and is the result of initial charging thereof under the control of the microprocessor during the last transaction carried out.

The thickness of the insulative layer of the transistor is significantly greater than that of the capacitive component. For example, it is approximately three times greater than that of the capacitive component. Depending on the intended application, the thickness of the insulative layer of the capacitive component is from approximately 4 nanometers to approximately 10 nanometers. When the capacitive component is charged by the external supply, and after the charging connection has been cut off by the microprocessor 14, the voltage at the terminals of the capacitive component 20 decreases slowly as the latter is progressively discharged across its own dielectric space. The discharge of the field-effect transistor across the dielectric space is negligible given the thickness of the latter.

For example, if, for a given dielectric space thickness, the gate and the plate of the capacitive component 6 are charged to 6 volts at time t=0, the time associated with a loss of charge of 1 volt, i.e. to a reduction of the voltage to 5 volts, is of the order of 24 seconds for a thickness of 8 nanometers.

The following table may be drawn up for different thicknesses:

| Time | 1 hour | 1 day | 1 week | 1 month |
| --- | --- | --- | --- | --- |
| Oxide thickness | 8.17 nm | 8.79 nm | 9.17 nm | 9.43 nm |
| Time accuracy | 1.85% | 2.09% | 2.24% | 3.10% |

The accuracy depends on the error in reading the drain current (approximately 0.1%). Accordingly, to be able to measure times of the order of one week, a dielectric space layer of the order of 9 nanometers thick may be provided.

FIG. 2 shows a particular architecture that uses a direct connection to the floating grid 28a, 28b to apply an electrical potential thereto and therefore to cause charges to flow therein. Indirect charging may also be used, as mentioned above, thanks to a control grid replacing the direct connection and employing the technology used to fabricate EPROM and EEPROM cells.

Figure 3:
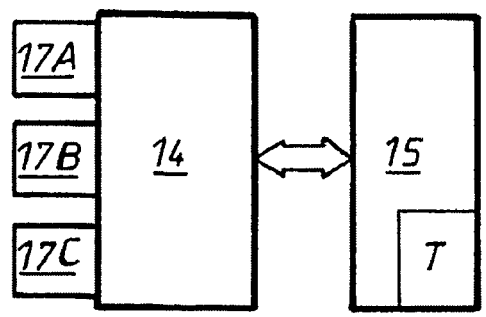
FIG. 3 is a block diagram of a variant.

The FIG. 3 variant provides three subsystems 17A, 17B, 17C each associated with the microprocessor 14. The subsystems 17A and 17B comprise capacitive components having relatively small leaks to measure relatively long times. However, these capacitive components are sensitive to temperature variables, as indicated above. The third subsystem 17C comprises a capacitive component having a very thin dielectric space, less than 5 nanometers thick. It is therefore insensitive to temperature variations. The two capacitive components of the subsystems 17A, 17B have different leaks across their respective dielectric spaces. The autonomous electrical entity further comprises means for processing the measurements of the respective residual charges present in the capacitive components of the first two subassemblies 17A, 17B, these processing means being adapted to extract from said measurements information representative of time and substantially independent of heat input to said entity during the elapsed time between two successive transactions. In the example, these processing means are none other than the microprocessor 14 and the memory 15. In particular, a space in the latter memory is reserved for storing a double-entry table T of time values that is addressed by the respective two measurements. In other words, a portion of the memory comprises a set of time values and each value corresponds to a pair of measurements resulting from reading the drain current of each of the two transistors of the temperature-sensitive subsystems 17A, 17B.

Accordingly, during a transaction, for example toward the end thereof, the two capacitive components are charged to a predetermined voltage by the external electrical power supply via the microprocessor 14. When the microcircuit card is decoupled from the server or card reader, the two capacitive components remain charged but begin to discharge across their respective dielectric spaces, and as time elapses without the microcircuit card being used the residual charge in each of the capacitive components decreases, although differently, because of the different leaks determined by their construction.

When the card is again coupled to an electrical power supply, on the occasion of a new transaction, the residual charges in the two capacitive components are representative of the same time interval to be determined, but different because of temperature variations that may have occurred during this time period. When the card is used again, the two field-effect transistors of the two subsystems are supplied with power and the drain current values are read and processed by the microcircuit. For each pair of drain current values, the microcircuit looks up the corresponding time value in said table in memory. That time value is then compared with the value available in the server and the transaction is authorized only if these two values coincide or are relatively close together.

It is not necessary to store the table T. For example, the processing means, i.e. essentially the microprocessor 14, may comprise software for calculating a predetermined function for determining said information as a function of the two measurements and substantially independently of the heat input.

As already indicated, the third subsystem 17C comprises an extremely thin dielectric space making it insensitive to temperature variations. This subsystem may be used, under the control of the microprocessor 14, to detect repeated resets that occur often in the event of a DPA attack.

Other variants are feasible. In particular, eliminating the capacitive component 20 as such to simplify the subsystem 17 may be envisaged, since the field-effect transistor 30 itself may be considered as a capacitive component with the grid 28b and the substrate 36 constituting its plates, separated by the dielectric space 34. In this case, said capacitive component and said measuring means may be considered to be one and the same.

The invention claimed is:

1. An electronic entity for carrying out transactions, comprising:
    at least one subsystem comprising a capacitive component having a dielectric space with a leak across the dielectric space;
    means for coupling said capacitive component to an electrical power supply so that the capacitive component is charged by said electrical power supply during a first transaction and for decoupling said capacitive component at the end of the transaction; and
    means for measuring a residual charge in said capacitive component during a new transaction, said residual charge being at least in part representative of a time elapsed since said first transaction, wherein fraud is detected by the time elapsed between said first transaction and said new transaction.

2. Electronic entity according to claim 1, characterized in that the electronic entity comprises switching means for decoupling said capacitive component from said electrical power supply.

3. Electronic entity according to claim 2, characterized in that said measuring means are used to determine an elapsed time.

4. Electronic entity according to claim 3, characterized in that, said capacitive component being charged during a transaction, said measuring means are used during a transaction of this type to provide information at least partly representative of the time elapsed since the last transaction.

5. Electronic entity according to claim 1, characterized in that the electronic entity is autonomous and in that said electrical power supply is external to the electronic entity.

6. Electronic entity according to claim 5, characterized in that the electronic entity is a microcircuit card.

7. Electronic entity according to claim 1, characterized in that said capacitive component (20) is a MOS technology capacitor whose dielectric space consists of silicon oxide.

8. Electronic entity according to claim 1, characterized in that said measuring means comprise a field-effect transistor (30) whose gate is connected to a terminal of said capacitive component.

9. Electronic entity according to claim 8, characterized in that said field-effect transistor is an MOS transistor, said gate (28b) floating during the time that elapses between two connections or couplings to an external power supply on the occasion of two successive transactions.

10. Electronic entity according to claim 9, characterized in that said field-effect transistor comprises an insulative layer between the gate electrode and a substrate, said capacitive component comprises an insulative layer (24) forming the aforementioned dielectric space disposed between a plate (28a) and a substrate (26), and said plate and said gate electrode are connected together.

11. Electronic entity according to claim 10, characterized in that the thickness of the insulative layer (34) of said transistor is substantially greater than the insulative layer (24) of said capacitive component.

12. Electronic entity according to claim 11, characterized in that the thickness of said insulative layer of said transistor is approximately three times that of said capacitive component.

13. Electronic entity according to claim 11, characterized in that the thickness of the insulative layer of said capacitive component is from 4 nanometers to 10 nanometers.

14. Electronic entity according to claim 8, characterized in that said field-effect transistor is an MOS transistor, said gate (28b) floating during the time that elapses between two connections or couplings to an external power supply on the occasion of two successive transactions.

15. An electronic entity for carrying out transactions, comprising:
    at least two subsystems, each subsystem comprising a capacitive component having a dielectric space with a leak across the dielectric space, said leaks of said at least two subsystems being different;
    means for coupling said capacitive components to an electrical power supply so that said capacitive components are charged by said electrical power supply during a first transaction and for decoupling said capacitive components at the end of said first transaction;
    means for measuring a respective residual charge in each of said capacitive components during a new transaction, each of said respective residual charges in said capacitive components being at least in part representative of a time elapsed since said first transaction; and means for processing measurements of said respective residual charges to extract from said measurements information substantially independent of heat input to said electronic entity during the time elapsed between the two transactions.

16. Electronic entity according to claim 15, characterized in that said processing means comprise a table of stored time values (T) addressed by said respective measurements.

17. Electronic entity according to claim 15, characterized in that the electronic entity comprises a memory space defining said table.

18. Electronic entity according to claim 15, characterized in that said processing means comprise software for calculating a predetermined function for determining said information as a function of said measurements and substantially independently of the heat input.

19. An electronic entity for carrying out transactions, comprising:

an electrical power supply;

a capacitive component having a dielectric space with a leak across the dielectric space;

a connector, said connector couples said capacitive component to the electrical power supply so that the capacitive component is charged by said electrical power supply during a first transaction and for decoupling said capacitive component at the end of the transaction; and a field-effect transistor, said field-effect transistor measures a residual charge in said capacitive component during a new transaction, said residual charge being at least in part representative of a time elapsed since said first transaction, wherein fraud is detected by the time elapsed between said first transaction and said new transaction.

* * * * *